(12) United States Patent
Kleiner et al.

(10) Patent No.: US 11,302,217 B2
(45) Date of Patent: Apr. 12, 2022

(54) AUGMENTED REALITY DEALER VEHICLE TRAINING MANUAL

(71) Applicant: TOYOTA MOTOR NORTH AMERICA, INC., Plano, TX (US)

(72) Inventors: David Kleiner, Plano, TX (US); Dale A. Carman, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 545 days.

(21) Appl. No.: 16/250,472

(22) Filed: Jan. 17, 2019

(65) Prior Publication Data

US 2020/0234610 A1    Jul. 23, 2020

(51) Int. Cl.

| G09B 19/16 | (2006.01) |
| G06T 19/00 | (2011.01) |
| B60K 35/00 | (2006.01) |
| G06F 3/04815 | (2022.01) |
| G06T 17/00 | (2006.01) |

(52) U.S. Cl.
CPC ............ *G09B 19/16* (2013.01); *B60K 35/00* (2013.01); *G06F 3/04815* (2013.01); *G06T 17/00* (2013.01); *G06T 19/006* (2013.01); *B60K 2370/1438* (2019.05); *B60K 2370/161* (2019.05); *G06F 2203/04808* (2013.01)

(58) Field of Classification Search
None
See application file for complete search history.

(56) References Cited

U.S. PATENT DOCUMENTS

| 8,606,645 | B1 | 12/2013 | Applefeld |
| 9,734,634 | B1 | 8/2017 | Mott et al. |
| 9,944,182 | B2 | 4/2018 | Platz et al. |
| 10,977,865 | B2* | 4/2021 | Yasrebi ................. G06T 19/006 |
| 2002/0077844 | A1 | 6/2002 | Hayashi |
| 2010/0070932 | A1 | 3/2010 | Hur |

(Continued)

FOREIGN PATENT DOCUMENTS

| CN | 106327939 | 1/2017 |
| CN | 106327990 | 1/2017 |

(Continued)

*Primary Examiner* — Tapas Mazumder
(74) *Attorney, Agent, or Firm* — Haynes and Boone, LLP (57) ABSTRACT

A method of educating a user of vehicle features with an augmented reality manual includes capturing, using an electronic device, a real-world environment including a two-dimensional representation of a marker and identifying the marker in the real-world environment, determining a plane associated with the marker with respect to the electronic device, and displaying the real-world environment on the electronic device. The method includes displaying, based at least in part on the plane associated with the marker, a three-dimensional representation of a portion of a vehicle, the portion of the vehicle being rendered such that the portion of the vehicle appears to be positioned in place of the marker in the real-world environment as displayed in the camera environment including a plurality of selectable features. The method further includes receiving a feature input selecting a vehicle feature and presenting feature information relating to the vehicle feature selected by the feature input.

20 Claims, 8 Drawing Sheets

(56) References Cited

U.S. PATENT DOCUMENTS

| | | |
|---|---|---|
| 2013/0106910 A1 | 5/2013 | Sacco |
| 2013/0317901 A1 | 11/2013 | Wang et al. |
| 2015/0030998 A1 | 1/2015 | Liu et al. |
| 2016/0103577 A1 | 4/2016 | Greenberg et al. |
| 2017/0061826 A1 | 3/2017 | Jain et al. |
| 2017/0308751 A1 | 4/2017 | Brockman et al. |
| 2017/0249856 A1 | 8/2017 | Fischer et al. |
| 2017/0301260 A1 | 10/2017 | Gussen et al. |
| 2018/0151088 A1 | 5/2018 | Tan et al. |
| 2018/0165988 A1 | 6/2018 | Wright et al. |
| 2018/0225896 A1 | 8/2018 | Daman et al. |
| 2020/0162836 A1* | 5/2020 | Beaurepaire ........... G06Q 10/00 |
| 2020/0265454 A1* | 8/2020 | Takasaki .............. G06Q 20/326 |
| 2020/0307616 A1* | 10/2020 | Nithiyanantham .... B60K 35/00 |

FOREIGN PATENT DOCUMENTS

| | | |
|---|---|---|
| CN | 106504604 | 3/2017 |
| CN | 108182843 | 6/2018 |
| KR | 20010044191 | 6/2001 |
| KR | 20120075580 | 7/2012 |
| KR | 20160000346 | 1/2016 |

* cited by examiner

AUGMENTED REALITY DEALER VEHICLE TRAINING MANUAL

TECHNICAL FIELD

The present disclosure relates generally to systems and methods for educating an individual about vehicle features. More particularly, the present disclosure relates to systems and methods for using augmented reality to display information to an electronic device user regarding features of a specific vehicle.

BACKGROUND

New vehicle product lines and updates to existing vehicles may include multiple changes, updates, and entirely new functionality that salespersons, maintenance persons, and interested persons, such as new car buyers, are unfamiliar with. Existing processes are in place to educate the salespersons and maintenance persons at vehicle dealerships as to the differences and updates for new models of vehicles, however these processes may be labor and cost intensive as either the dealership personnel must be transported to interact with the new vehicles in person, or the new vehicles must be transported to the dealership. The time period to receive and review new vehicles at a dealership may be substantial if demand is high and some dealerships may receive new vehicles with very little to no time available to the dealership personnel before the first sale is made. Additionally, interested persons, such as the new car buyers or automotive journalists may desire to learn about a new model or new features but may not be in a geographic location that facilitates personally inspecting a vehicle, or the new vehicles may not yet be available to the public. It would therefore be desirable to provide a method for the dealership personnel and the interested persons to interact with the new vehicles in a learning capacity without requiring the physical presence of the new vehicles. Additionally, it would be desirable for the dealership personnel and the interested persons to interact with the new vehicles in a variety of non-specialized settings using non-specialized devices. Therefore, what is needed is an apparatus, system, or method that addresses one or more of the foregoing issues, and or/one or more other issues.

SUMMARY

The present disclosure provides apparatus and methods for presenting augmented reality for educating a user about vehicle features. A method of educating a user of vehicle features with an augmented reality manual includes capturing, using a camera of an electronic device, a first real-world environment including a two-dimensional representation of a marker. The method further includes identifying, by a processor of the electronic device, the two-dimensional representation of the marker in the first real-world environment. The method further includes determining a first plane associated with the two-dimensional representation of the marker with respect to the electronic device. The method further includes displaying the first real-world environment as a camera environment on an integrated display screen of the electronic device. The method further includes displaying on the display screen, based at least in part on the first plane associated with the two-dimensional representation of the marker, a three-dimensional representation of a portion of a vehicle, the three-dimensional representation of the portion of the vehicle being rendered such that the three-dimensional representation of the portion of the vehicle appears to be positioned in place of the two-dimensional representation of the marker in the first real-world environment as displayed in the camera environment, wherein the three-dimensional representation of the portion of the vehicle includes a plurality of selectable features. The method further includes receiving a feature input selecting a vehicle feature of the plurality of selectable features of the vehicle. The method further includes presenting, on the display screen, feature information relating to the vehicle feature selected by the feature input.

An augmented reality manual for educating a user about vehicle features includes an integrated display screen, a camera configured to capture an image for display on the display screen, and a controller. The controller includes a processor and a memory, the memory including instructions that, when executed by the processor, cause the processor to perform a set of operations. The processor is caused to capture, using the camera, at least one frame of a video including a representation of a first real-world environment, the at least one frame including a two-dimensional representation of a marker. The processor is further caused to determine an orientation of the display screen with respect to the first real-world environment. The processor is further configured to determine a plane of the two-dimensional representation of the marker in the frame with respect to the display screen. The processor is further caused to render a camera environment of the first real-world environment for display on the display screen based at least in part on the plane of the two-dimensional representation of the marker and the orientation of the display screen. The processor is further caused to display a three-dimensional representation of a dashboard of a selected vehicle in the camera environment, wherein the three-dimensional representation of the dashboard includes three-dimensional representations of at least a steering wheel, an instrument cluster spaced in the three-dimensional representation behind the steering wheel, and a center console. The processor is further configured to receive a feature input selecting a dashboard feature of the three-dimensional representation of the dashboard of the selected vehicle. The processor is further configured to present feature information on the display screen relating to the dashboard feature selected by the feature input.

Another augmented reality manual for educating a user about vehicle features includes a non-transitory computer-readable medium having one or more instructions corresponding to an augmented reality application that, when executed by a processor, cause the processor to receive, by the augmented reality application from an image capture unit communicatively coupled to the processor, an image of a first real-world environment including at least one surface. The processor is further caused to receive, by the augmented reality application, a vehicle selection from a list of vehicles to identify a selected vehicle. The processor is further caused to present, by the augmented reality application on a display device, a three-dimensional representation of a dashboard of the selected vehicle onto the surface, wherein the three-dimensional representation of the dashboard includes three-dimensional representations of at least a steering wheel, an instrument cluster spaced in the three-dimensional representation behind the steering wheel, and a center console. The processor is further caused to receive, by the augmented reality application, a feature input selecting a dashboard feature of the three-dimensional representation of the dashboard of the selected vehicle. The processor is further caused to present feature information on the display device about the dashboard feature of the dashboard of the selected vehicle based on the feature input received.

DETAILED DESCRIPTION

For the purposes of promoting an understanding of the principles of the invention, reference will now be made to certain implementations, or examples, illustrated in the drawings, and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

The disclosure describes a method, system, and apparatus for educating a user of vehicle features with an augmented reality manual. The apparatus/system includes an electronic device including at least a display screen, a camera configured to capture an image for display on the display screen, and a controller including a processor and a memory including instructions to cause the processor to perform a variety of functions in order to present a three-dimensional representation of a portion of a vehicle to a user for visual inspection and interaction with the three-dimensional representation of the portion of the vehicle. By imaging a real-world environment and locating a two-dimensional representation of a marker the electronic device is able to determine an orientation of the display screen of the electronic device relative to the marker and to determine a plane associated with the two-dimensional representation of the marker. The electronic device can then render a camera environment of the real-world environment for display on the display screen based at least in part on the plane of the two-dimensional representation of the marker and the orientation of the display screen. Using this rendering of the camera environment, the electronic device displays a three-dimensional representation of a portion of a selected vehicle, for example a dashboard. The three-dimensional representation of the dashboard may include, for example, three-dimensional representations of at least a steering wheel, and instrument cluster spaced in the three-dimensional representation of the dashboard behind the steering wheel, and a center console. The electronic device is able to receive a feature input, which may be a touch input from a user, selecting a feature associated with the three-dimensional representation of the portion of the selected vehicle, and to then present feature information on the display screen relating to the selected feature so that a user may interact with the three-dimensional representation of the portion of the selected vehicle.

Figure 1:
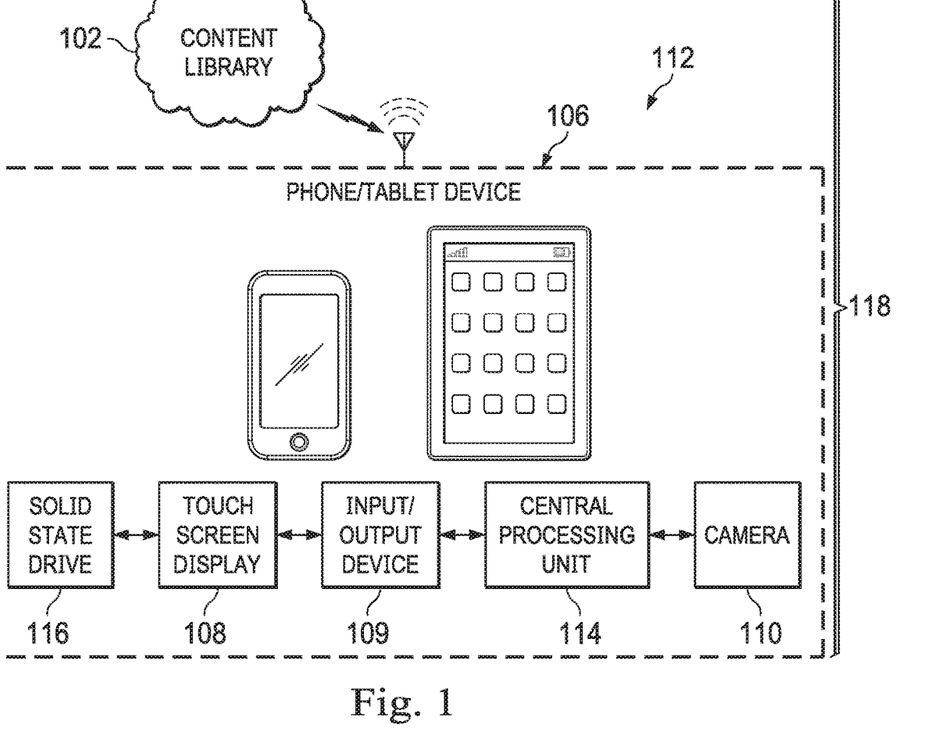
FIG. 1 is a detailed diagrammatic view of an augmented reality manual system, according to one or more embodiments of the present disclosure.

FIG. 1 is a diagrammatic illustration of an augmented reality manual system, generally referred to by the reference numeral 100, for educating a user of vehicle features with an augmented reality manual according to one or more embodiments of the present disclosure. The augmented reality manual system 100 includes a content library 102, a network 104, and an electronic device 106. As shown in FIG. 1, the electronic device 106 includes an integrated display screen 108, a camera 110, and a controller 112. The controller 112 includes a processor 114, or central processing unit, and a memory 116. In this embodiment, the memory 116 may be a solid-state drive or other type of memory storage device. In some embodiments, the electronic device 106, which is operably coupled to, and adapted to be in communication with, the content library 102 includes a transmitter and a receiver. In some embodiments, the transmitter and the receiver may be omitted according to the particular application for which the electronic device 106 is to be used. In some embodiments, the transmitter and the receiver are combined into a transceiver capable of both sending and receiving wireless signals. In any case, the electronic device 106 is adapted to send/receive data to/from the network 104. In the example embodiment, the electronic device 106 is adapted to communicate wirelessly communicate with the content library 102 via a network 104 (e.g., a 3G network, a 4G network, a 5G network, a Wi-Fi network, an ad hoc network, or the like).

In some embodiments, as in FIG. 1, the electronic device 106 is a portable user device computing being used by a user/interested party. In an embodiment, the interested party is a salesperson, a technician, or a person otherwise affiliated with the manufacture, sale, distribution, and maintenance of a vehicle, for example. In another embodiment, the interested party is a customer searching for a vehicle to purchase or an owner desiring to learn about features unique to their vehicle. In some embodiments, the electronic device 106 is a handheld or otherwise portable device which is carried or otherwise manipulated by the interested party. In some embodiments, the electronic device 106, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the electronic device 106 is a tablet, such as, for example, an iPad® by Apple Inc.

In some embodiments, as in FIG. 1, the electronic device 106 includes the camera 110 adapted to capture an image for display on the display screen 108. In this embodiment, the electronic device 106 includes at least one input and output device or system that enables a user to interact with the electronic device 106 and the augmented reality manual. For example, as in FIG. 1, the electronic device 106 may include the display screen 108 and an integrated or separate input/output ("I/O") device 109. The display screen 108 may be, include, or be part of multiple display units. For example, in some embodiments, the display screen 108 may include one or any combination, of a central display unit or any other type of display unit adapted to visually present the augmented reality manual to a user; accordingly, as used herein, "display screen" may refer to one, or any combination, of the display screen 108. The I/O device 109 may be a stand-alone device, such as a keyboard, or, as in FIG. 1, may be a touch-sensitive portion of the display screen 108. Other examples of sub-components that may be part of the electronic device 106 include, but are not limited to, audible feedback apparatuses, visual alerts, tactile alerts, telecommunications equipment, and computer-related components, peripherals, and systems.

Figure 2:
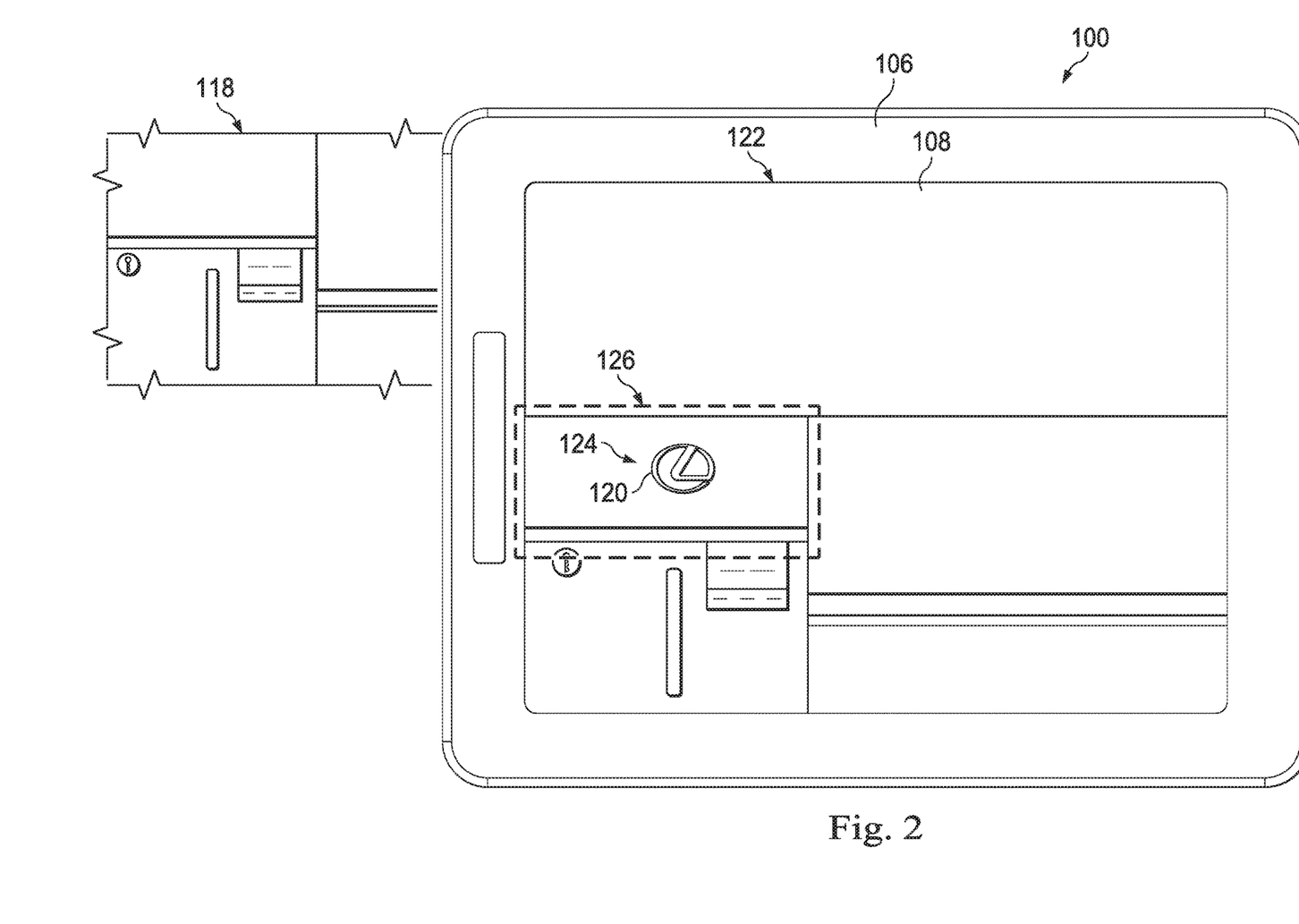
FIG. 2 is a diagrammatic illustration of the augmented reality manual system of FIG. 1 illustrating a user computing device displaying a representation of a real-world environment and a two-dimensional representation of a marker, according to one or more embodiments of the present disclosure.

Referring to FIG. 2, electronic device 106 of the augmented reality manual system 100 is illustrated as displaying a representation of the first real-world environment 118 and a two-dimensional representation of a marker 120. In some embodiments, as in FIG. 2, the two-dimensional representation of the marker 120 is a two-dimensional representation of a Lexus® symbol. In some embodiments, the two-dimensional representation of the marker 120 may be any type of symbol. In some embodiments, as in FIG. 2, the two-dimensional representation of the marker 120 is a virtual two-dimensional representation of the marker 120 that is illustrated in the camera environment 122, that is, displayed on the display screen 108 of the electronic device 106. In some embodiments, the two-dimensional representation of the marker 120 may be projected from the electronic device 106 or some other device onto a surface and viewed through the camera environment 122 on the display screen 108 or directly by the user.

In some embodiments, as in FIG. 2, at least one frame of a video of the first real-world environment 118, including the two-dimensional representation of the marker 120 at a virtual location 124, is captured by the camera 110. In some embodiments, as in FIG. 2, an orientation of the display screen 108 with respect to the first real-world environment 118 is determined. In this regard, the processor 114, or the controller 112, may process environmental data from an accelerometer coupled to the electronic device 106 to determine the orientation of the display screen 108 relative to the first real-world environment 118. In some embodiments, the electronic device 106 may determine the orientation of the display screen 108 by processing information contained within the camera environment 122, such as positional markers present in the first real-world environment 118. With further reference to FIG. 2, a plane 126 of the two-dimensional representation of the marker 120 with respect to the display screen 108 is then determined. Based on the determined orientation of the display screen 108 relative to the first real-world environment 118 and the determined plane 126 of the two-dimensional representation of the marker 120, the electronic device 106 is configured to render the camera environment 122 for display on the display screen 108.

Figure 3:
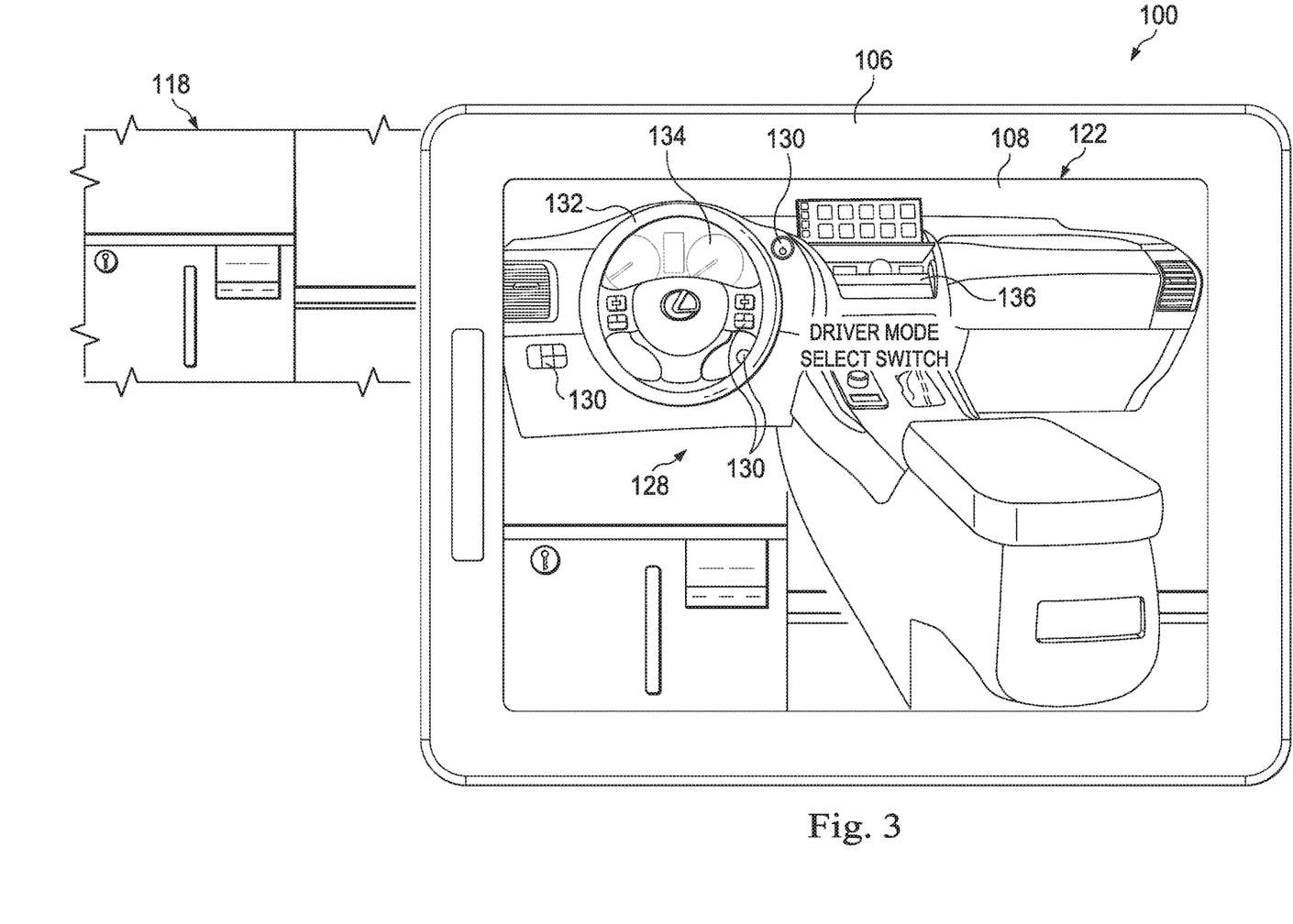
FIG. 3 is a diagrammatic illustration of the augmented reality manual system of FIG. 1 illustrating a user computing device displaying a three-dimensional representation of a vehicle dashboard of a selected vehicle in a camera environment.

Referring to FIG. 3, the electronic device 106 of the augmented reality manual system 100 is illustrated as displaying a three-dimensional representation of a portion of a selected vehicle in the camera environment 122 at the virtual location 124. In some embodiments, as in FIG. 3, the three-dimensional representation of a portion of the selected vehicle is a three-dimensional representation of a dashboard 128 In some embodiments, as in FIG. 3, the three-dimensional representation of the dashboard 128 includes three-dimensional representations of a plurality of dashboard features 130 including at least a steering wheel 132, an instrument cluster 134 spaced in the three-dimensional representation behind the steering wheel 132, and a center console 136, all generated in a location corresponding to the location and the plane 126 of the representation of the two-dimensional marker 120. In some embodiments, as in FIG. 3, the three-dimensional representation of the dashboard 128 includes a three-dimensional image generated from a scan of a vehicle dashboard in a real-world environment. In some embodiments, the three-dimensional representation of the dashboard 128 is generated from a plurality of images of a second a vehicle dashboard in a real-world environment. In some embodiments, the three-dimensional representation of the portion of the selected vehicle may be a three-dimensional representation of any portion of the selected vehicle.

In some embodiments, the plurality of dashboard features 130 are displayed as selectable dashboard features on the three-dimensional representation of the dashboard 128. In some embodiments, as in FIG. 3, three-dimensional representation of the dashboard 128 further includes three-dimensional representations of a plurality of buttons, levers, and selectable mechanical user interface dashboard features 130. In some embodiments, the augmented reality user manual includes an automated tour of the three-dimensional representation of the dashboard 128 including an automated tour of the plurality of selectable dashboard features 130. In some embodiments, the augmented reality user manual includes a vehicle selection module including a plurality of selectable vehicles identified therein. In an embodiment, a vehicle selection list including the plurality of selectable vehicles is displayed on the display screen for the user to select from in order to display a three-dimensional representation of a dashboard 128 associated with the selected vehicle.

Figure 4:
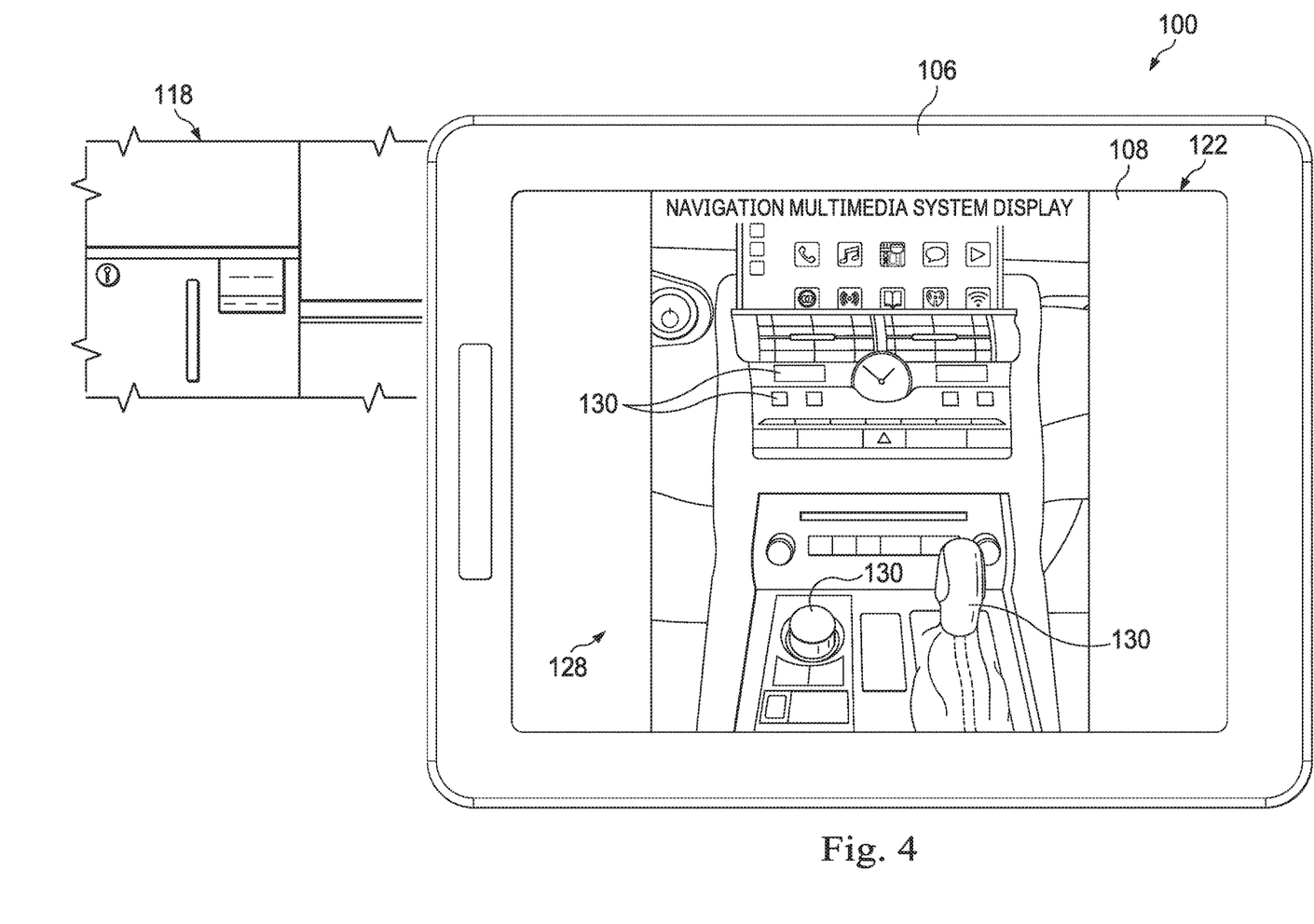
FIG. 4 is a diagrammatic illustration of the augmented reality manual system of FIG. 1 illustrating a user computing device displaying a three-dimensional representation of a center console portion of a vehicle dashboard of a selected vehicle in a camera environment.
Figure 5:
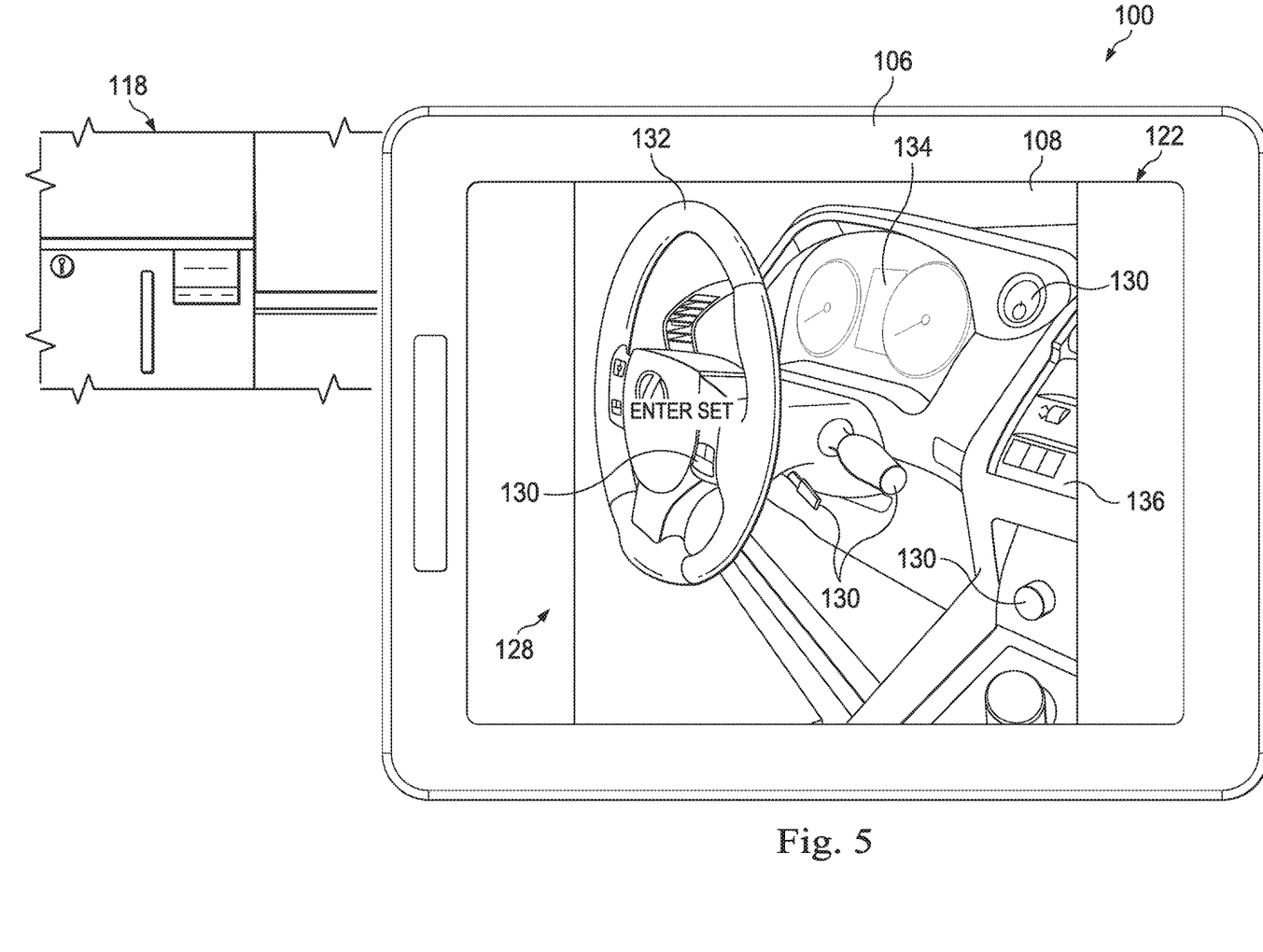
FIG. 5 is a diagrammatic illustration of the augmented reality manual system of FIG. 1 illustrating a user computing device displaying a three-dimensional representation of a right side of a vehicle control panel of a vehicle dashboard of a selected vehicle in a camera environment.
Figure 6:
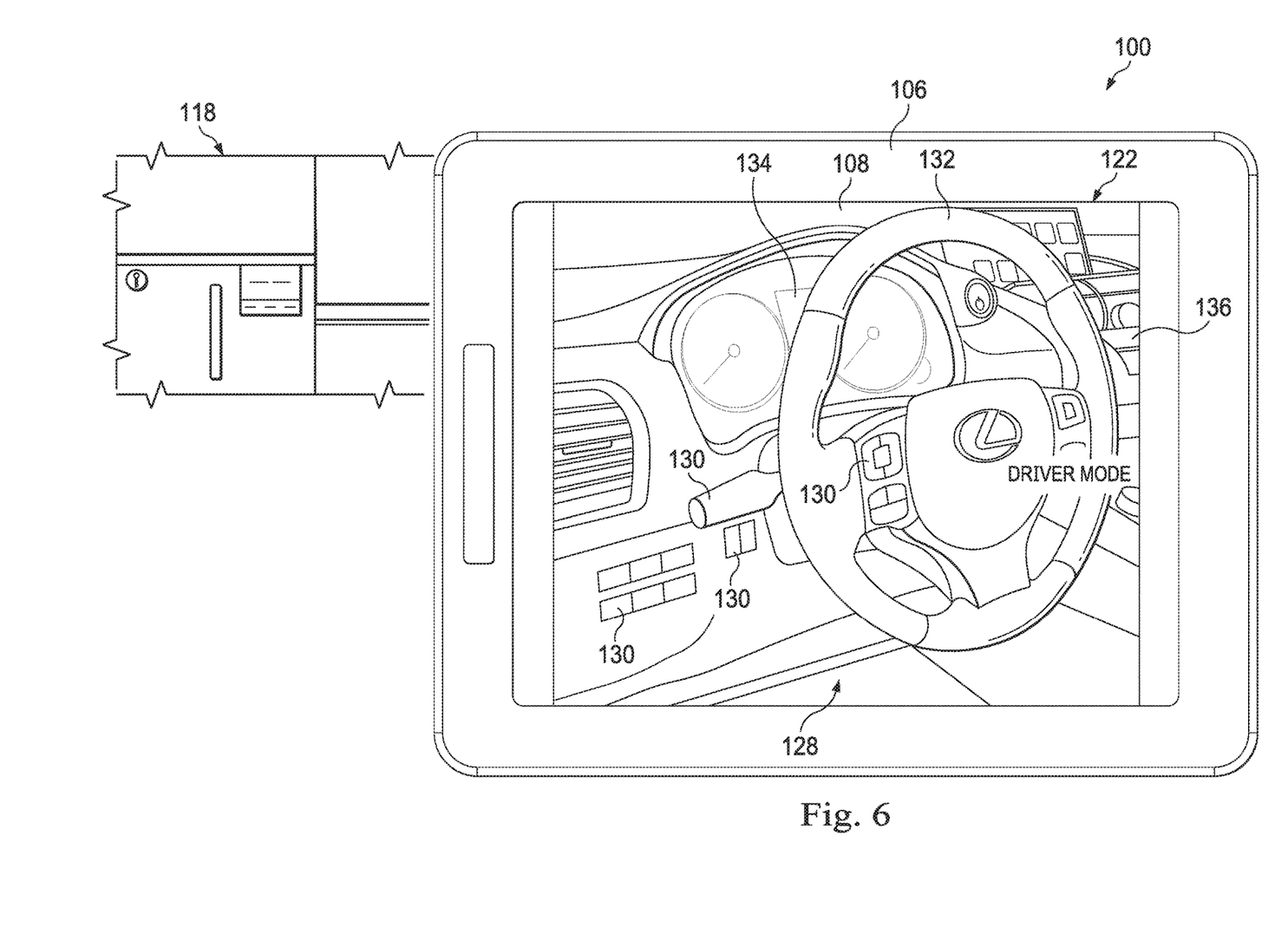
FIG. 6 is diagrammatic illustration of the augmented reality manual system of FIG. 1 illustrating a user computing device displaying a three-dimensional representation of a left side of a vehicle control panel of a vehicle dashboard of a selected vehicle in a camera environment.

Referring to FIGS. 4-6, the electronic device 106 of the augmented reality manual system 100 is illustrated as displaying three-dimensional representations of portions of the dashboard 128 in the selected vehicle in the camera environment. As shown in FIGS. 4-6, the three-dimensional representation of the dashboard 128 displayed on the display screen 108 may change as the position of the electronic device 106 relative to the originally selected location of the two-dimensional representations of the marker 120. In some embodiments, as in FIGS. 4-6, the processor 114 may be configured to detect a change in orientation of the display screen 108. After detecting the change in the orientation of the display screen 108, the processor 114 may be configured to rotate the three-dimensional representation of the dashboard 128 to correspond to the change in the orientation of the display screen 108. In some embodiments, as shown in FIGS. 4-6, the position and orientation of the electronic device 106 has been altered relative to the initial position of the electronic device 106, causing the three-dimensional representation of the dashboard 128 displayed on the display screen 108 to change.

As shown in FIG. 4, the three-dimensional representation of the dashboard 128 displayed on the display screen 108 illustrates a smaller portion of the three-dimensional representation of the dashboard 128 than is illustrated as being displayed on the display screen 108 in FIG. 3, indicating that the electronic device 106 has been moved closer to a middle portion of the three-dimensional representation of the dashboard 128. More specifically, as shown in FIG. 4, electronic device 106 is illustrated as displaying the center console portion of the three-dimensional representation of the dashboard 128. Physically moving the electronic device 106 closer to the virtual location 124 corresponding to the location in the first real-world environment results in a zooming function relative to the three-dimensional representation of the dashboard 128 on the display screen 108. In some embodiments, the electronic device 106 is virtually assigned to a location in the first real-world environment based on a physical location of the electronic device 106. In some embodiments, a zoom function may be incorporated into the electronic device 106 so that a user may zoom in on a desired portion of the three-dimensional representation of the dashboard 128 without physically moving the electronic device 106 closer to the virtual location 124.

Referring to FIGS. 5 and 6, the electronic device 106 is illustrated as displaying three-dimensional representations of right and left views of the dashboard 128, respectively, of the selected vehicle in the camera environment 122. With reference to FIG. 5, the three-dimensional representation of the dashboard 128 illustrated on the display screen 108 indicates that the electronic device 106 has been moved physically closer to the virtual location 124 and has been panned to the left relative to the three-dimensional representation of the dashboard 128. With reference to FIG. 6, the three-dimensional representation of the dashboard 128 illustrated on the display screen 108 indicates that the electronic device 106 has been moved physically closer to the virtual location 124, that the electronic device 106 has been physically moved laterally to the left relative to the three-dimensional representation of the dashboard 128, and that the electronic device 106 has been panned to the right relative to the three-dimensional representation of the dashboard 128, illustrating the left view of the three-dimensional representation of the dashboard 128. In some embodiments, the panning and lateral motion functions may be incorporated into a digital function of the electronic device 106 such that the user may direct the electronic device 106 to alter the relative views of the three-dimensional representation of the dashboard 128 without changing the position or orientation of the electronic device 106.

In some embodiments, as shown in FIGS. 4-6, movement of the electronic device 106 relative to the virtual location 124 of the three-dimensional representation of the dashboard 128 causes the display screen 108 to display additional selectable vehicle dashboard features 130 disposed behind other displayed portions of the three-dimensional representation of the dashboard 128 that were not previously illustrated on the display. This is because the three-dimensional representation includes layered or overlapping features. In some embodiments, the additional selectable dashboard features may be illustrated on the display screen 108 as a result of the user directing the electronic device 106 to alter the relative views of the three-dimensional representation of the dashboard 128 illustrated on the display screen 108, as described further above.

Figure 7:
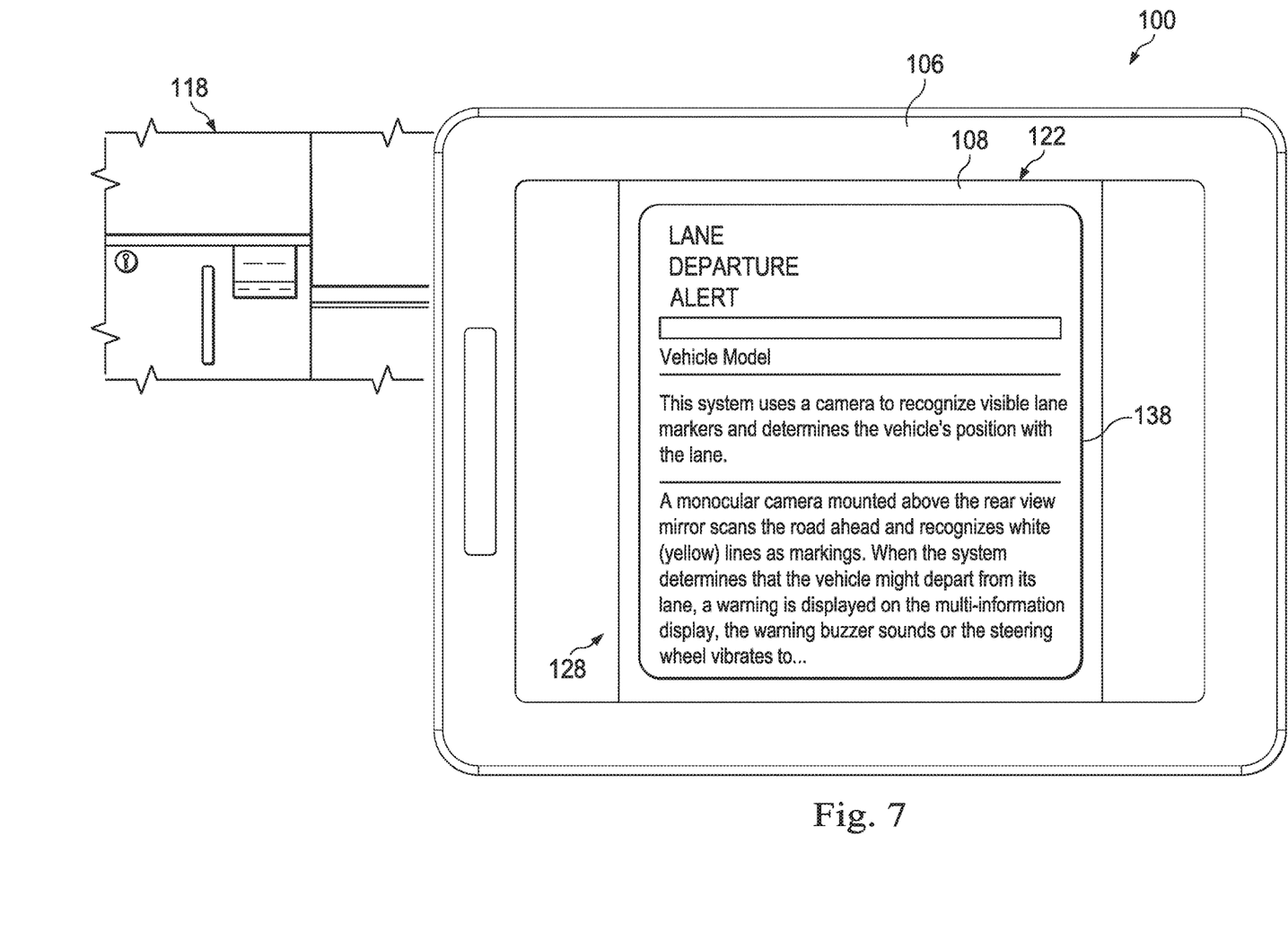
FIG. 7 is a diagrammatic illustration of the augmented reality manual system of FIG. 1 illustrating a user computing device displaying feature information relating to a dashboard feature of the three-dimensional representation of a vehicle dashboard of a selected vehicle in a camera environment.

In some embodiments, with reference to FIG. 7, the electronic device 106 of the augmented reality manual system 100 is configured to receive a dashboard feature input selecting one of the plurality of dashboard features 130 of the three-dimensional representation of the dashboard 128 of the selected vehicle. As shown in FIG. 7, feature information 148 is presented on the display screen 108 relating to the dashboard feature 130 selected by the feature input. In some embodiments, as in FIG. 7, the feature information 148 includes myriad information related to the function of the selected dashboard feature 130. In this embodiment, at least a portion of the feature information 148 relating to the dashboard feature 130 selected by the feature input is obtained from the content library 102 over a network connection via network 104.

Referring to FIG. 7, the feature input that causes the feature information 148 to be presented on the display screen 108 is a touch input on the display screen 108 on the three-dimensional representation of the dashboard 128. Additionally, in this embodiment, a single touch input causes a first type of feature information 148 related to the selected dashboard feature 130 to be presented on the display screen 108, and a double touch input causes a second type of feature information 148 related to the selected dashboard feature 130 to be presented on the display screen 108. In some embodiments, the first type of feature information 148 is related to function of the selected dashboard feature 130 and the second type of feature information 148 is related to the method of using the selected dashboard feature 130. In some embodiments, a touch or other type of user input may be used to present a vehicle selection input to the electronic device 106 including one of the plurality of selectable vehicles from the vehicle selection listed described above.

Figure 8:
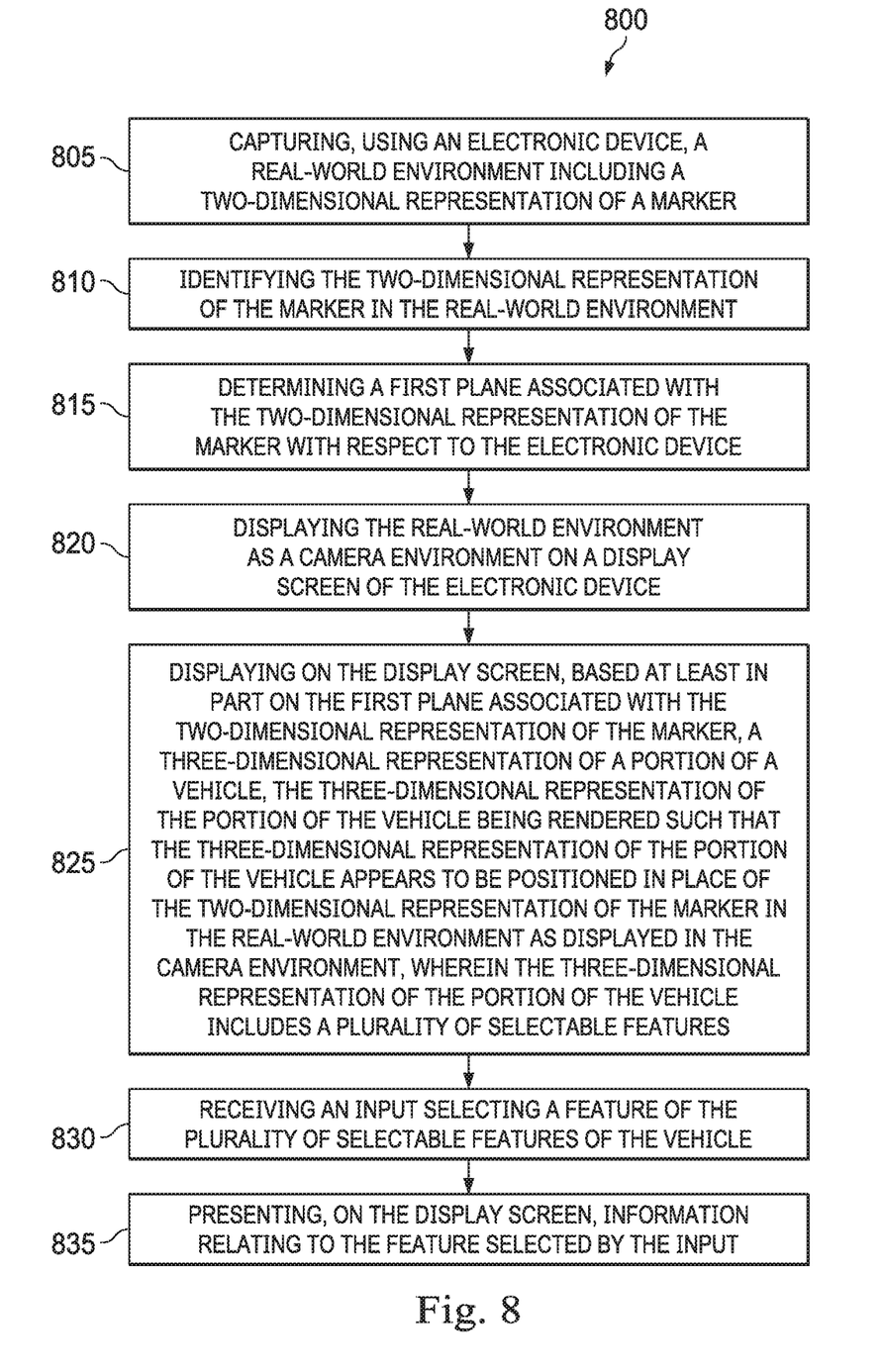
FIG. 8 is a flow diagram of a method of implementing one or more embodiments of the present disclosure.

Referring to FIG. 8, a method of educating a user of vehicle features with an augmented reality manual of the augmented reality manual system 100 is generally referred to by the reference numeral 800 and is illustrated as a set of operations or steps 805 through 835. Not all of the illustrated steps 805 through 835 may be performed in all embodiments of the method 800. Additionally, one or more steps that are not expressly illustrated in FIG. 8 may be included before, after, in between, or as part of the steps 805 through 835. In some embodiments, one or more the steps 805 through 835 may be implemented, at least in part, in the form of executable code stored on non-transitory, tangible machine-readable media that when run by one or more processors may cause the one or more processors to perform one or more of the processes. In one or more embodiments, the steps 805 through 835 may be performed by the augmented reality manual system 100 from FIG. 1.

The method 800 includes at a step 805, capturing, using the camera of the electronic device 106, the first real-world environment 118 including the two-dimensional representation of the marker 120. In some embodiments, capturing the first real-world environment 118 includes using the camera 110 coupled to the electronic device 106 to capture an image of the first real-world environment 118. The method 800 includes at a step 810, identifying, by a processor of the electronic device, the two-dimensional representation of the marker 120 in the first real-world environment 118. The method 800 includes at a step 815, determining the plane 126 associated with the two-dimensional representation of the marker 120 with respect to the electronic device 106. The method 800 includes at a step 820, displaying the first real-world environment 118 as the camera environment 122 on the display screen 108 of the electronic device 106.

The method 800 includes at a step 825, displaying on the display screen 108, based at least in part on the plane 126 associated with the two-dimensional representation of the marker 120, a three-dimensional representation of a portion of the vehicle, in this instance a three-dimensional representation of a dashboard 128, the three-dimensional representation of the dashboard 128 being rendered such that the three-dimensional representation of the dashboard 128 appears to be positioned in place of the two-dimensional marker 120 in the first real-world environment 118 as displayed in the camera environment 122, wherein the three-dimensional representation of the dashboard 128 includes the plurality of the selectable features 130.

In some embodiments, the three-dimensional representation of the dashboard 128, or other portion of the vehicle, includes displaying at least one of a three-dimensional image generated from a scan of the dashboard 128 or other portion of the vehicle in a second real-world environment and a three-dimensional image generated from a plurality of images of the vehicle in the second real-world environment. In some embodiments, displaying the three-dimensional representation of the dashboard 128 or other portion of the vehicle includes displaying an automated tour of the three-dimensional representation of the dashboard 128 or other portion of the vehicle. In some embodiments, displaying the three-dimensional representation of the dashboard 128 or other portion of the vehicle includes displaying a plurality of features 130 as selectable features 130 on the three-dimensional representation of the dashboard 128 or other portion of the vehicle.

The method 800 includes at a step 830, receiving the feature input selecting the vehicle feature 130 of the plurality of selectable features 130 of the vehicle. In some embodiments, the feature input selecting the vehicle feature 130 may be a touch input received on the display screen 108. The method 800 includes at a step 835, presenting, on the display screen 108, feature information relating to the vehicle feature 130 selected by the feature input. In some embodiments, presenting the feature information 148 includes presenting the feature information 148 relating to the vehicle feature 130 selected by the feature input. In some embodiments, receiving a single touch input on the display screen 108 causes a first type of feature information 148 related to the vehicle feature 130 selected by the feature input to be presented on the display screen 108. In some embodiments, a double touch input on the display screen 108 causes a second type of the feature information 148 related to the vehicle feature 130 to be presented on the display screen 108.

Figure 9:
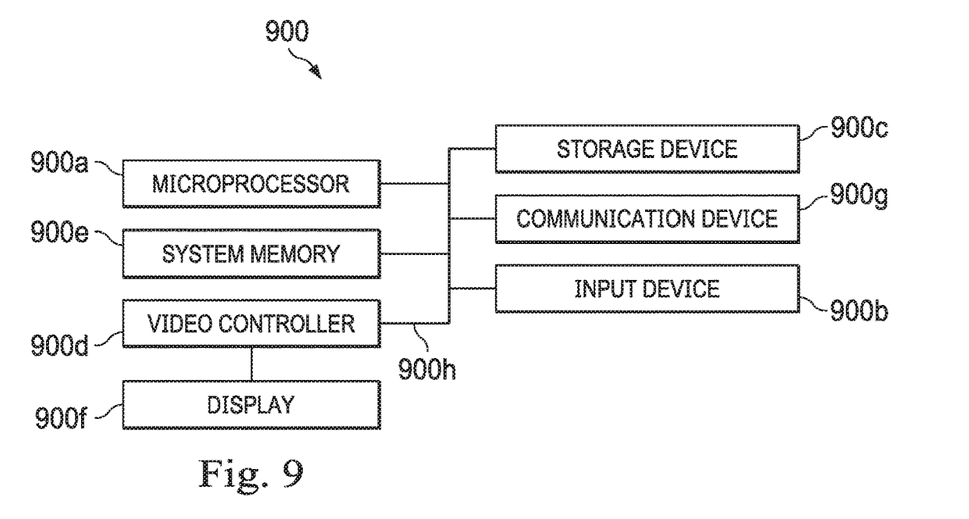
FIG. 9 is a diagrammatic illustration of a computing node for implementing one or more embodiments of the present disclosure.

Referring to FIG. 9, in an embodiment, a computing node 1000 for implementing one or more embodiments of one or more of the above-described elements, controller (e.g., 112), apparatus (e.g., 106), systems (e.g., 100), methods (e.g., 800) and/or steps (e.g., 805, 810, 815, 820, 825, 830 and/or 835), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., controller 112), apparatus (e.g., 106), systems (e.g., 100), methods (e.g., 800) and/or steps (e.g., 805, 810, 815, 820, 825, 830 and/or 835), and/or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes educating a user of vehicle features with an augmented reality manual by: capturing, using a camera of an electronic device, a first real-world environment including a two-dimensional representation of a marker; identifying, by a processor of the electronic device, the two-dimensional representation of the marker in the first real-world environment; determining a first plane associated with the two-dimensional representation of the marker with respect to the electronic device; displaying the first real-world environment as a camera environment on an integrated display screen of the electronic device; displaying on the display screen, based at least in part on the first plane associated with the two-dimensional representation of the marker, a three-dimensional representation of a portion of a vehicle, the three-dimensional representation of the portion of the vehicle being rendered such that the three-dimensional representation of the portion of the vehicle appears to be positioned in place of the two-dimensional representation of the marker in the first real-world environment as displayed in the camera environment, wherein the three-dimensional representation of the portion of the vehicle includes a plurality of selectable features; receiving a feature input selecting a vehicle feature of the plurality of selectable features of the vehicle; and presenting, on the display screen, feature information relating to the vehicle feature selected by the feature input.

The foregoing method embodiment may include one or more of the following elements, either alone or in combination:

Detecting a change in orientation of the display screen and in response to detecting the change in orientation, rotating the three-dimensional representation displayed on the display screen to display additional selectable vehicle features disposed behind other displayed portions of the vehicle.

Displaying vehicle features disposed behind a steering wheel in the three-dimensional representation of the portion of the vehicle.

Receiving a vehicle selection input selecting the vehicle from a plurality of selectable vehicle.

Receiving the feature input as a touch input on the display screen, where a single touch input causes a first type of feature information related to the vehicle feature selected by the feature input to be presented on the display screen, and where a double touch input causes a second type of feature information related to the vehicle feature to be presented on the display screen.

Displaying on the display screen the three-dimensional representation of the portion of the vehicle includes displaying at least one of a three-dimensional image generated from a scan of the portion of the vehicle in a second real-world environment and a three-dimensional image generated from a plurality of images of the vehicle in the second real-world environment.

Displaying on the display screen an automated tour of the three-dimensional representation of the portion of the vehicle.

Displaying on the display screen the three-dimensional representation of the portion of the vehicle including a plurality of features as selectable features on the three-dimensional representation of the portion of the vehicle.

An augmented reality manual for educating a user about vehicle features is disclosed. The augmented reality manual generally includes an integrated display screen, a camera configured to capture an image for display on the display screen, and a controller including a processor and a memory. The memory includes instructions that, when executed by the processor, cause the processor to: capture, using the camera, at least one frame of a video including a representation of a first real-world environment, the at least one frame including a two-dimensional representation of a marker; determine an orientation of the display screen with respect to the first real-world environment; determine a plane of the two-dimensional representation of the marker in the frame with respect to the display screen; render a camera environment of the first real-world environment for display on the display screen based at least in part on the plane of the two-dimensional representation of the marker and the orientation of the display screen; display a three-dimensional representation of a dashboard of a selected vehicle in the camera environment, wherein the three-dimensional representation of the dashboard includes three-dimensional representations of at least a steering wheel, an instrument cluster spaced in the three-dimensional representation behind the steering wheel, and a center console; receive a feature input selecting a dashboard feature of the three-dimensional representation of the dashboard of the selected vehicle; and present information on the display screen relating to the dashboard feature selected by the feature input.

The memory further includes instructions to cause the processor to: detect a change in orientation of the display screen; and rotate the three-dimensional representation displayed on the display screen to display additional selectable vehicle features disposed behind other displayed portions of the selected vehicle.

The memory includes a vehicle selection module having a plurality of selectable vehicle identified therein, wherein a vehicle selection list including the plurality of selectable vehicles is displayed on the display screen, and wherein the vehicle selection module is configured to receive a vehicle selection input including one of the plurality of selectable vehicles from the vehicle selection list.

The feature input is a touch input on the display screen, wherein a single touch input causes a first type of feature information related to the dashboard feature selected by the feature input to be presented on the display screen, and wherein a double touch input causes a second type of feature information related to the dashboard feature selected by the feature input to be presented on the display screen.

The three-dimensional representation of the dashboard includes at least one of a three-dimensional image generated from a scan of a vehicle dash in a second real-world environment and a three-dimensional image generated from a plurality of images of a second real-world environment vehicle dashboard.

The augmented reality manual includes an automated tour of the three-dimensional representation of the dashboard.

A plurality of features are displayed as selectable features on the three-dimensional representation of the dashboard.

The three-dimensional representation of the dashboard further includes three-dimensional representations of a plurality of buttons, levers, and selectable mechanical user interface features.

At least a portion of the feature information relating to the dashboard feature selected by the feature input is obtained from a network connection.

An augmented reality manual for educating a user about vehicle features has been disclosed. The augmented reality manual generally includes a non-transitory computer readable medium having one or more instructions corresponding to an augmented reality application that, when executed by a processor, cause the processor to: receive, by the augmented reality application from an image capture unit communicatively coupled to the processor, an image of a first real-world environment including at least one surface; receive, by the augmented reality application, a vehicle selection from a list of vehicle to identify a selected vehicle; present, by the augmented reality application, a three-dimensional representation of a dashboard of the selected vehicle onto the surface, wherein the three-dimensional representation of the dashboard includes three-dimensional representations of at least a steering wheel, an instrument cluster spaced in the three-dimensional representation behind the steering wheel, and a center console; receive, by the augmented reality application, a feature input selecting a dashboard feature of the three-dimensional representation of the dashboard of the selected vehicle; and present feature information on the display device about the dashboard feature of the dashboard of the selected vehicle based on the feature input received.

The foregoing apparatus embodiment may include one or more of the following elements, either alone or in combination with one another:

The instructions further include instructions to cause the processor to: determine an orientation of the display device with respect to the first real-world environment; detect a change in orientation of the display device; and rotate the three-dimensional representation displayed on the display device to display additional selectable vehicle features disposed behind other displayed portions of the selected vehicle.

The non-transitory computer-readable medium includes a vehicle selection module having a plurality of selectable vehicles identified therein, wherein a vehicle selection list including the plurality of selectable vehicles is displayed on the display device, and wherein the vehicle selection module is configured to receive a vehicle selection input including one of the plurality of selectable vehicles from the vehicle selection list.

The feature input is a touch input on the display device, wherein a single touch input causes a first type of feature information related to the dashboard feature selected by the feature input to be presented on the display device, and wherein a double touch input causes a second type of feature information related to the dashboard feature selected by the feature input to be presented on the display device.

The three-dimensional representation of the dashboard includes at least one of a three-dimensional image generated from a scan of a vehicle dash in a second real-world environment and a three-dimensional image generated from a plurality of images of a second real-world environment vehicle dashboard.

The augmented reality manual includes at least one of an automated tour of the three-dimensional representation of the dashboard and a plurality of features that are displayed as selectable features on the three-dimensional representation of the dashboard.

The three-dimensional representation of the dashboard further includes three-dimensional representations of a plurality of buttons, levers, and selectable mechanical user interface features.

At least a portion of the feature information relating to the dashboard feature selected by the feature input is obtained from a network connection.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A method of educating a user of vehicle features with an augmented reality manual, comprising:
   capturing, using a camera of an electronic device, a first real-world environment including a two-dimensional representation of a marker;
   identifying, by a processor of the electronic device, the two-dimensional representation of the marker in the first real-world environment;
   determining a first plane associated with the two-dimensional representation of the marker with respect to the electronic device;
   displaying the first real-world environment as a camera environment on an integrated display screen of the electronic device;
   displaying on the display screen, based at least in part on the first plane associated with the two-dimensional representation of the marker, a three-dimensional representation of a portion of a vehicle, the three-dimensional representation of the portion of the vehicle being rendered such that the three-dimensional representation of the portion of the vehicle appears to be positioned in place of the two-dimensional representation of the marker in the first real-world environment as displayed in the camera environment, wherein the three-dimensional representation of the portion of the vehicle includes a plurality of selectable features;
   receiving a feature input selecting a vehicle feature of the plurality of selectable features of the vehicle; and
   presenting, on the display screen, feature information relating to the vehicle feature selected by the feature input.

2. The method of claim 1, comprising detecting a change in orientation of the display screen and in response to detecting the change in orientation, rotating the three-dimensional representation displayed on the display screen to display additional selectable vehicle features disposed behind other displayed portions of the vehicle.

3. The method of claim 2, wherein displaying additional selectable vehicle features includes displaying vehicle features disposed behind a steering wheel in the three-dimensional representation of the portion of the vehicle.

4. The method of claim 1, further comprising receiving a vehicle selection input selecting the vehicle from a plurality of selectable vehicles.

5. The method of claim 1, wherein receiving the feature input includes receiving a touch input on the display screen, wherein receiving a single touch input causes a first type of feature information related to the vehicle feature selected by the feature input to be presented on the display screen, and wherein receiving a double touch input causes a second type of feature information related to the vehicle feature to be presented on the display screen.

6. The method of claim 1, wherein displaying on the display screen the three-dimensional representation of the portion of the vehicle includes one of:
   displaying at least one of a three-dimensional image generated from a scan of the portion of the vehicle in a second real-world environment and a three-dimensional image generated from a plurality of images of the vehicle in the second real-world environment;
   displaying an automated tour of the three-dimensional representation of the portion of the vehicle; and
   displaying a plurality of features as selectable features on the three-dimensional representation of the portion of the vehicle.

7. The method of claim 1, wherein presenting feature information includes presenting feature information relating to the vehicle feature selected by the feature input.

8. An augmented reality manual for educating a user about vehicle features, comprising:
   a display screen;
   a camera configured to capture an image for display on the display screen;
   a controller including a processor and a memory, the memory including instructions that, when executed by the processor, cause the processor to:
      capture, using the camera, at least one frame of a video including a representation of a first real-world environment, the at least one frame including a two-dimensional representation of a marker;
      determine an orientation of the display screen with respect to the first real-world environment;
      determine a plane of the two-dimensional representation of the marker in the frame with respect to the display screen;
      render a camera environment of the first real-world environment for display on the display screen based at least in part on the plane of the two-dimensional representation of the marker and the orientation of the display screen;
      display a three-dimensional representation of a dashboard of a selected vehicle in the camera environment, wherein the three-dimensional representation of the dashboard includes three-dimensional representations of at least a steering wheel, an instrument cluster spaced in the three-dimensional representation of the dashboard behind the steering wheel, and a center console;
      receive a feature input selecting a dashboard feature of the three-dimensional representation of the dashboard of the selected vehicle; and
      present feature information on the display screen relating to the dashboard feature selected by the feature input.

9. The augmented reality manual of claim 8, wherein the instructions further comprise instructions to cause the processor to:
   detect a change in orientation of the display screen; and
   rotate the three-dimensional representation of the dashboard displayed on the display screen to display additional selectable vehicle features disposed behind other displayed portions of the selected vehicle.

10. The augmented reality manual of claim 8, wherein the memory includes a vehicle selection module having a plurality of selectable vehicles identified therein, wherein a vehicle selection list including the plurality of selectable vehicles is displayed on the display screen, and wherein the vehicle selection module is configured to receive a vehicle selection input including one of the plurality of selectable vehicles from the vehicle selection list.

11. The augmented reality manual of claim 10, wherein the feature input is a touch input on the display screen, wherein receiving a single touch input causes a first type of feature information related to the vehicle feature selected by the feature input to be presented on the display screen, and wherein receiving a double touch input causes a second type of feature information related to the vehicle feature to be presented on the display screen.

12. The augmented reality manual of claim 10, wherein the three-dimensional representation of the dashboard includes one of:
a three-dimensional image generated from a scan of a vehicle dashboard in a second real-world environment;
a three-dimensional image generated from a plurality of images of a second real-world environment vehicle dashboard;
an automated tour of the three-dimensional representation of the dashboard; and
a plurality of features displayed as selectable features on the three-dimensional representation of the dashboard.

13. The augmented reality manual of claim 10, wherein the three-dimensional representation of the dashboard further includes three-dimensional representations of a plurality of buttons, levers, and selectable mechanical user interface features.

14. The augmented reality manual of claim 8, wherein at least a portion of the feature information relating to the dashboard feature selected by the feature input is obtained from a network connection.

15. An augmented reality manual for educating a user about vehicle features, comprising: a non-transitory computer-readable medium having one or more instructions corresponding to an augmented reality application that, when executed by a processor, cause the processor to:
receive, by the augmented reality application from an image capture unit communicatively coupled to the processor, an image of a first real-world environment including at least one surface;
receive, by the augmented reality application, a vehicle selection from a list of vehicles to identify a selected vehicle;
present, by the augmented reality application on a display device, a three-dimensional representation of a dashboard of the selected vehicle onto the surface, wherein the three-dimensional representation of the dashboard includes three-dimensional representations of at least a steering wheel, an instrument cluster spaced in the three-dimensional representation behind the steering wheel, and a center console;
receive, by the augmented reality application, a feature input selecting a dashboard feature of the three-dimensional representation of the dashboard of the selected vehicle; and
present feature information on the display device about the dashboard feature of the dashboard of the selected vehicle based on the feature input received.

16. The augmented reality manual of claim 15, wherein the instructions further comprise instructions to cause the processor to:
determine an orientation of the display device with respect to the first real-world environment;
detect a change in orientation of the display device; and
rotate the three-dimensional representation displayed on the display device to display additional selectable vehicle features disposed behind other displayed portions of the selected vehicle.

17. The augmented reality manual of claim 15, wherein the non-transitory computer-readable medium includes a vehicle selection module having a plurality of selectable vehicles identified therein, wherein a vehicle selection list including the plurality of selectable vehicles is displayed on the display device, and wherein the vehicle selection module is configured to receive a vehicle selection input including one of the plurality of selectable vehicles from the vehicle selection list.

18. The augmented reality manual of claim 17, wherein the feature input is a touch input on the display device.

19. The augmented reality manual of claim 18, wherein a single touch input causes a first type of feature information related to the dashboard feature selected by the feature input to be presented on the display device, and wherein a double touch input causes a second type of feature information related to the dashboard feature selected by the feature input to be presented on the display device.

20. The augmented reality manual of claim 17, wherein the three-dimensional representation of the dashboard includes one of:
a three-dimensional image generated from a scan of a vehicle dashboard in a second real-world environment;
a three-dimensional image generated from a plurality of images of a second real-world environment vehicle dashboard;
an automated tour of the three-dimensional representation of the dashboard;
a plurality of features displayed as selectable features on the three-dimensional representation of the dashboard; and
three-dimensional representations of a plurality of buttons, levers, and selectable mechanical user interface features.

* * * * *